US011430483B2

(12) United States Patent
Licht et al.

(10) Patent No.: US 11,430,483 B2
(45) Date of Patent: Aug. 30, 2022

(54) SYSTEM, METHOD, AND KIT FOR USING TRIGGERING OBJECTS TO CREATE CONCATENATED AUDIO/VIDEO

(71) Applicant: Daniel Licht, Toronto (CA)

(72) Inventors: Daniel Licht, Toronto (CA); Jonathan Enders, Toronto (CA)

(73) Assignee: Daniel Licht, Toronto (CA)

( * ) Notice: Subject to any disclaimer, the term of this patent is extended or adjusted under 35 U.S.C. 154(b) by 0 days.

(21) Appl. No.: 17/052,554

(22) PCT Filed: May 8, 2019

(86) PCT No.: PCT/CA2019/050608
§ 371 (c)(1),
(2) Date: Nov. 3, 2020

(87) PCT Pub. No.: WO2019/213760
PCT Pub. Date: Nov. 14, 2019

(65) Prior Publication Data
US 2021/0249048 A1    Aug. 12, 2021

Related U.S. Application Data

(60) Provisional application No. 62/681,138, filed on Jun. 6, 2018, provisional application No. 62/669,619, filed on May 10, 2018.

(51) Int. Cl.
*G11B 27/031* (2006.01)
*A63F 13/213* (2014.01)
(Continued)

(52) U.S. Cl.
CPC .......... *G11B 27/031* (2013.01); *A63F 13/213* (2014.09); *A63F 13/655* (2014.09); *A63F 13/92* (2014.09); *G06V 20/10* (2022.01)

(58) Field of Classification Search
None
See application file for complete search history.

(56) References Cited

U.S. PATENT DOCUMENTS 6,901,561 B1    5/2005  Kirkpatrick et al.
8,166,421 B2    4/2012  Magal et al.
(Continued)

FOREIGN PATENT DOCUMENTS

WO    2009052553 A1    4/2009
WO    2013127443 A1    9/2013
(Continued)

OTHER PUBLICATIONS

"Google's ML Kit offers easy machine learning APIs for Android and iOS"; https://arstechnica.com/gadgets/2018/05/googles-ml-kit-offers-easy-machine-learning-apis-for-android-and-ios/; May 8, 2018.
(Continued)

*Primary Examiner* — Gelek W Topgyal
(74) *Attorney, Agent, or Firm* — ABM Intellectual Property Inc.; Adrienne Bieber McNeil

(57) ABSTRACT

A system for playing audio/video includes a set of triggering objects. Each triggering object has a respective computer readable image. The system further includes a camera for capturing images within a zone of interactivity, an audiovisual output device, and a set of stored responses. Each response corresponds to at least one of the triggering objects. The system further includes a computing device connected to the camera and to the audiovisual output device. The computing device is configured to i) determine when a first one of the triggering objects and/or a second one of the triggering objects is within the zone of interactivity; ii) identify a first pre-produced audiovisual response corresponding to the first one of the triggering objects and identify a second pre-produced audiovisual response corresponding to the second one of the triggering objects; and iv)
(Continued)

concatenate the first pre-produced audiovisual response and the second pre-produced audiovisual response.

19 Claims, 8 Drawing Sheets

(51) Int. Cl.
*A63F 13/655* (2014.01)
*A63F 13/92* (2014.01)
*G06V 20/10* (2022.01)

(56) References Cited

U.S. PATENT DOCUMENTS

| | | | |
|---|---|---|---|
| 8,307,295 B2 | 11/2012 | Haskell et al. | |
| 8,786,682 B2 | 7/2014 | Shpunt et al. | |
| 9,108,114 B2 | 8/2015 | Goh et al. | |
| 9,158,389 B1 | 10/2015 | Sharma et al. | |
| 9,514,570 B2 | 12/2016 | Keating et al. | |
| 2013/0037606 A1* | 2/2013 | Murdoch | G06F 16/13 235/375 |
| 2013/0202213 A1 | 8/2013 | Adamek et al. | |
| 2015/0079573 A1 | 3/2015 | Haseltine et al. | |
| 2015/0133023 A1* | 5/2015 | Lewis | A63H 33/26 446/91 |
| 2015/0199975 A1 | 7/2015 | Won et al. | |
| 2015/0339532 A1 | 11/2015 | Sharma et al. | |
| 2017/0039468 A1 | 2/2017 | Zeiler | |
| 2017/0206693 A1 | 7/2017 | Sharma et al. | |
| 2017/0302905 A1* | 10/2017 | Shteinfeld | H04N 13/204 |
| 2018/0012261 A1* | 1/2018 | Cai | G06Q 30/0271 |
| 2018/0021675 A1 | 1/2018 | Hodgson et al. | |
| 2018/0093192 A1 | 4/2018 | Hodgson et al. | |
| 2019/0108430 A1* | 4/2019 | Coppedge | G06K 19/06037 |

FOREIGN PATENT DOCUMENTS

| | | | | |
|---|---|---|---|---|
| WO | WO-2017089968 A1 * | 6/2017 | | G06F 16/7867 |
| WO | 2017165860 A1 | 9/2017 | | |

OTHER PUBLICATIONS https://www.kickstarter.com/projects/playshifu/plugo-an-immersive-educational-ar-gaming-system/description, Aug. 1, 2018.

International Search Report & Written Opinion of the International Searching Authority in parent PCT application No. PCT/CA2019/050608, dated Jul. 22, 2019.

* cited by examiner

SYSTEM, METHOD, AND KIT FOR USING TRIGGERING OBJECTS TO CREATE CONCATENATED AUDIO/VIDEO

CROSS-REFERENCES TO RELATED APPLICATIONS

This application is a national stage entry of International Patent Application No. PCT/CA2019/050608, filed on May 8, 2019, which claims the benefit of and/or priority from U.S. Provisional Patent Application No. 62/669,619, filed on May 10, 2018, and U.S. Provisional Patent Application No. 62/681,138, filed on Jun. 6, 2018, all of which are incorporated herein by reference in their entirety.

FIELD

This document relates to the playing of audio/video. Specifically, this document relates to systems, methods, and kits for creating and optionally playing audio/video, for example concatenated audio/video.

BACKGROUND

US Patent Application Publication No. 2017/0206693 A1 (Sharma et al.) discloses activity scene detection, display, and enhancement implementations. In an example implementation, a method includes displaying an animated character on a display of a computing device, detecting a tangible interface object on a physical activity scene proximate to the computing device, rendering a virtual interface object based on the tangible interface object, determining an interaction routine between the animated character and the virtual interface object, and executing the animation routine to animate on the display, an interaction between the animated character and the virtual interface object.

SUMMARY

The following summary is intended to introduce the reader to various aspects of the detailed description, but not to define or delimit any invention.

According to some aspects, a system for playing audio/video includes a set of triggering objects, a camera for capturing images within a zone of interactivity in a field of view of the camera, an audiovisual output device, and a computing device connected to the camera and to the audiovisual output device. Each triggering object of the set has a respective computer readable image. Each response of the set of stored responses corresponds to at least one of the triggering objects. The computing device is configured to i) process the images and determine, based on the computer readable images, when a first one of the triggering objects is within the zone of interactivity; ii) identify, from the set of stored responses, a response corresponding to the first one of the triggering objects, wherein the response corresponding to the first one of the triggering objects is a first pre-produced audiovisual response; iii) process the images and determine, based on the computer readable images, when a second one of the triggering objects is within the zone of interactivity; iv) identify, from the set of stored responses, a response corresponding to the second one of the triggering objects, wherein the response corresponding to the second one of the triggering objects is a second pre-produced audiovisual response; and v) after the first one of the triggering objects and the second one of the triggering objects have been placed within the zone of interactivity, concatenate the first pre-produced audiovisual response and the second pre-produced audiovisual response to yield concatenated audio/video.

In some examples, concatenation of the first pre-produced audiovisual response and the second pre-produced audiovisual response includes triggering the audiovisual output device to play the first pre-produced audiovisual response and the second pre-produced audiovisual response in sequence.

In some examples, the first pre-produced audiovisual response includes a first video clip, the second audiovisual response includes a second video clip, and the concatenated audio/video includes the first video clip and the second video clip in sequence.

In some examples, the stored responses include video responses and/or audio responses. The video responses can include animated videos, live action videos, and/or computer-generated videos.

In some examples, each computer readable image includes a respective a coded cue. Each respective coded cue can be repeated on the triggering object for redundancy. Each computer readable image can further include an orienting image for guiding the computing device in reading the coded cue.

In some examples, each triggering object of the set includes a playing card having a first face and a second face. The coded cue can be on the first face. The second face can include an indicium. The indicium can be representative of the response corresponding to the respective triggering object. The indicium can be computer-readable.

In some examples, the zone of interactivity is three-dimensional.

In some examples, the stored responses are stored in local memory of the computing device.

In some examples, the camera, the audio-video output device, and the computing device are packaged into a single gaming device.

In some examples, the set of triggering objects includes at least one controlling object, and the computing device is configured to i) determine, based the computer readable images, when the controlling object is within the zone of interactivity; ii) identify, from the set of stored responses, a controlling response corresponding to the controlling object; and iii) when the controlling object is placed within the zone of interactivity, put the system in a secondary mode of operation. In the secondary mode of operation, the concatenated audio/video can be user editable. The concatenated audio/video can be user editable to place the first pre-produced audiovisual response and the second pre-produced audiovisual response in a different order, to remove at least one of the first pre-produced audiovisual response and the second pre-produced audiovisual response from the concatenated audio/video, and/or to insert an additional audiovisual response into the concatenated audio/video at a specific point.

In some examples, the computing device is configured to determine a sequence in which the first one of the triggering objects and the second one of the triggering objects are placed within the zone of interactivity, and to concatenate the first pre-produced audiovisual response and the second pre-produced audiovisual response in the sequence.

In some examples, the computing device is configured to determine when multiple triggering objects are concurrently within the zone of interactivity, and to trigger one of a set of substitute responses based on the presence of and the computer readable image on the multiple triggering objects.

In some examples, the computing device is further configured to vi) determine, based the computer readable images, when additional triggering objects are within the zone of interactivity; vii) identify, from the set of stored responses, additional pre-produced audiovisual responses corresponding to the additional triggering objects, and viii) when the additional triggering objects have been placed within the zone of interactivity, concatenate the additional pre-produced audiovisual responses with the first pre-produced audiovisual response and the second pre-produced audiovisual response.

According to some aspects, a method for playing audio/video includes a) capturing a first set of images within a zone of interactivity in a field of view of a camera; b) processing the first set of images with a computing device to determine when a first triggering object has been placed within the zone of interactivity; c) with the computing device, from a set of stored responses, identifying a first pre-produced audiovisual response corresponding to the first triggering object; d) capturing a second set of images within the zone of interactivity in the field of view of the camera; e) processing the second set of images with the computing device to determine when a second triggering object has been placed within the zone of interactivity; f) with the computing device, from the set of stored responses, identifying a second pre-produced audiovisual response corresponding to the second triggering object; and g) concatenating the first pre-produced audiovisual response and the second pre-produced audiovisual response to yield concatenated audio/video.

In some examples, step b. includes, with the computing device, reading a coded cue on the first triggering object.

In some examples, the first triggering object includes an indicium of the first audio-visual response, and step b. includes, with the computing device, reading the indicium.

In some examples, the method further includes capturing a third set of images within the zone of interactivity in the field of view of the camera; processing the third set of images with the computing device to determine when a controlling object has been placed within the zone of interactivity; with the computing device, from the set of stored responses, identifying a controlling response corresponding to the controlling object; and entering a secondary mode of operation.

In some examples, the method includes editing the concatenated audio/video when in the secondary mode of operation. Editing the concatenated audio/video can include placing the first pre-produced audiovisual response and the second pre-produced audiovisual response in a different order, removing at least one of the first pre-produced audiovisual response and the second pre-produced audiovisual response from the concatenated audio/video, and/or inserting an additional pre-produced audiovisual response into the concatenated audio/video at a specific point.

In some examples, step g. includes determining a sequence in which the first triggering object and the second triggering object are placed within the zone of interactivity, and concatenating the first pre-produced audiovisual response and the second audiovisual response in the sequence.

In some examples, the method further includes, with the computing device, determining when multiple triggering objects are concurrently placed within the zone of interactivity, and triggering one of a set of substitute responses based on the presence of the multiple triggering objects.

In some examples, the method further includes capturing additional sets of images within the zone of interactivity in the field of view of the camera; processing the additional set of images to determine when additional triggering objects have been placed within the zone of interactivity; with the computing device, from the set of stored responses, identifying additional pre-produced audiovisual response corresponding to the additional triggering objects; and concatenating the additional pre-produced audiovisual responses with the first pre-produced audiovisual response and the second pre-produced audiovisual response to yield the concatenated audio/video.

According to some aspects, a kit for playing audio/video includes a set of triggering objects. Each triggering object of the set includes a respective non-reflective card having a first face and a second face. Each card has, respectively, at least two redundant computer readable coded cues on the first face. The computer readable coded cues correspond to an audiovisual response stored remotely from the triggering object. An indicium is on the second face. The indicium is representative of the audiovisual response.

The kit can further include a stand for holding an audiovisual output device.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
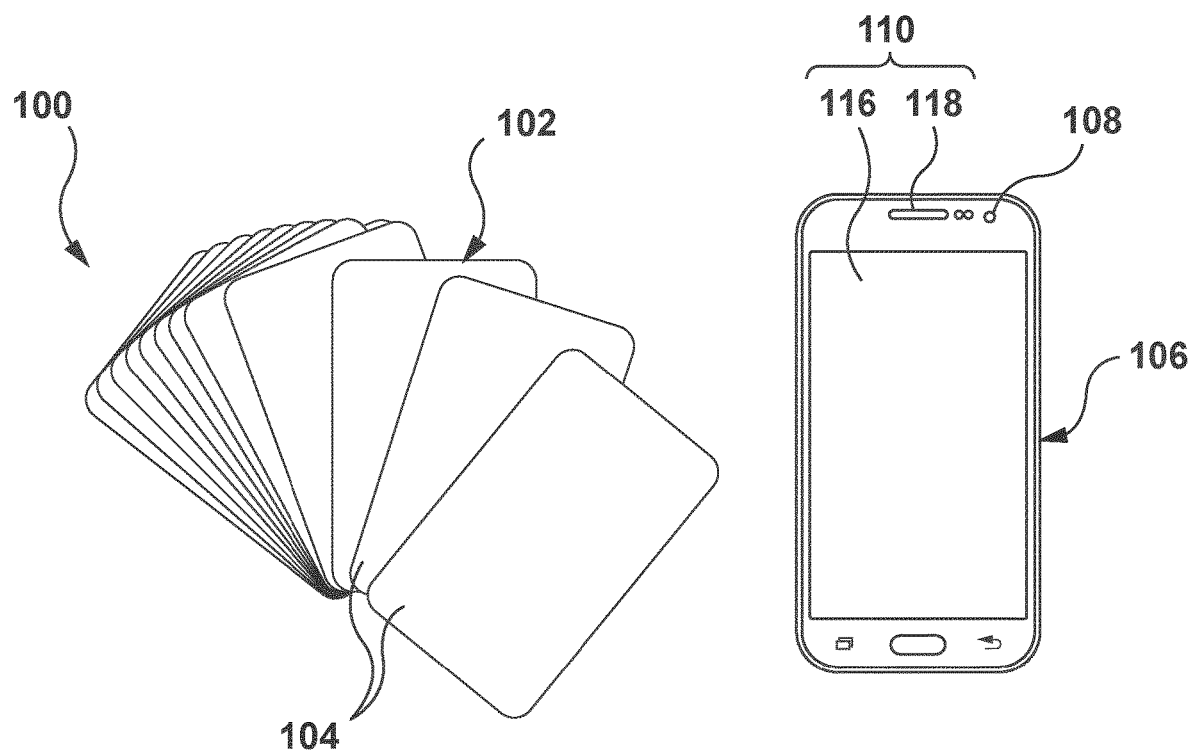
FIG. 1 is a perspective view of a system for playing audio/video, including a gaming device and asset of triggering objects.

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

In general, disclosed herein are systems, methods, and kits for creating and/or playing audio/video, including but not limited to animated video, live-action video, computer-generated video, audio books, sound effects, and/or music. The systems, methods, and kits may in some examples form or be part of a game, such as a children's game. The game may allow for users to create/play video and/or audio by sequencing together pre-produced video clips (also referred to as scenes), and/or sections of music, and/or other audio/video material.

The game may in some examples include a set of triggering objects such as playing cards, together with a downloadable app. The app may contain a set of pre-produced audiovisual responses (e.g. pre-produced video clips and/or audio sections). For example, the pre-produced audiovisual responses may include clips of animated video. Each playing card may be associated with one or more of the pre-produced audiovisual responses. The playing cards may have one side printed with an image representing the associated audiovisual response. For example, one of the pre-produced audiovisual responses may be an animated video clip of a character walking on a sidewalk. The playing card associated with that pre-produced audiovisual response may be printed with an image of that character walking on a sidewalk. The opposite side of each playing card may include a computer-readable image (e.g. a coded cue).

In some examples, in use, with the app open on a gaming device such as a tablet or smart-phone, the cards may be dealt amongst users. For example, from a deck of two hundred cards, seven cards may be dealt to each of two players. The players may take turns flashing the computer-readable image of their cards in front of the camera of the gaming device. The player can select which card to flash based, for example, on the printed image on the card, and/or based on the cards previously flashed in the game, to create the desired next part of the story. As each card is flashed, the gaming device may play the pre-produced audiovisual response associated with that card. The sequential flashing of the cards and playing of the pre-produced audiovisual responses creates a story, which is built up as the cards are played. When all of the cards have been played (or at another time, e.g. upon input by a user), the app may concatenate the pre-produced audiovisual responses associated with the cards that have been played, to create a video that appears as a pre-produced show containing the clips corresponding to the cards that have been played.

Referring now to FIGS. 1 to 7, the systems, methods, and kits will be explained in further detail, by way of example.

Referring to FIG. 1, an example system 100 for playing audio/video is shown. The system includes a set 102 of triggering objects 104, and a gaming device 106. The set 102 of triggering objects 104 may be sold separately from the gaming device 106 or together with the gaming device 106.

In the example shown, the gaming device 106 is a smart-phone. In alternative examples, the gaming device may be a tablet, a laptop or desktop computer, a purpose-built device, a tool, or another type of handheld or portable or desktop or tabletop device. In yet further alternative examples, instead of a single gaming device, a set of devices may be used—e.g. a camera, a video screen, a speaker, and/or a computer, all of which can be standalone parts that are in communication and collectively form a gaming device.

Figure 3:
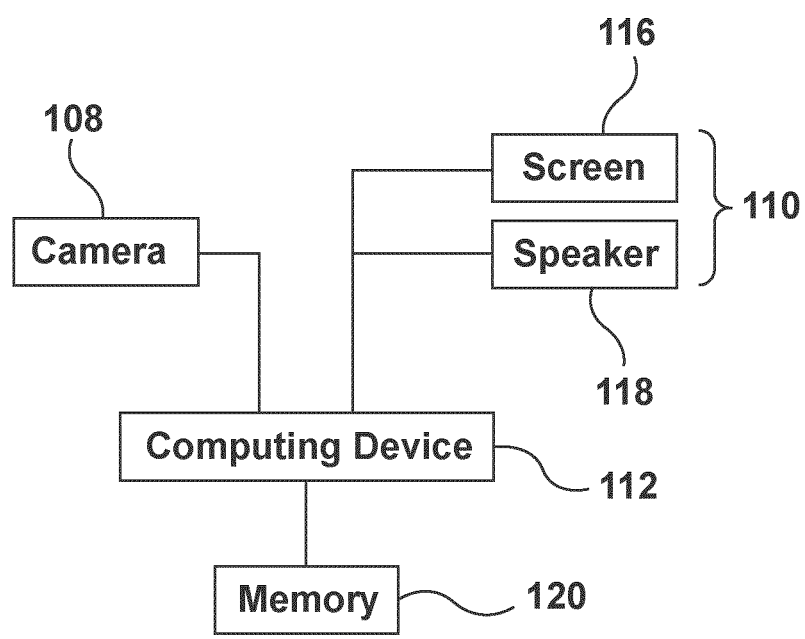
FIG. 3 is a schematic diagram of the hardware of the gaming device of FIG. 1.

Referring still to FIG. 1, in the example shown, the gaming device 106 includes a camera 108, an audiovisual output device 110, and a computing device 112 (shown schematically in FIG. 3). In alternative examples, the gaming device may include additional cameras (e.g. 2 or more cameras). In further alternative examples, a camera can include more than one lens. The cameras/lenses can be tuned to capture different regions or focuses within the same zone of interactivity (described below).

Figure 2:
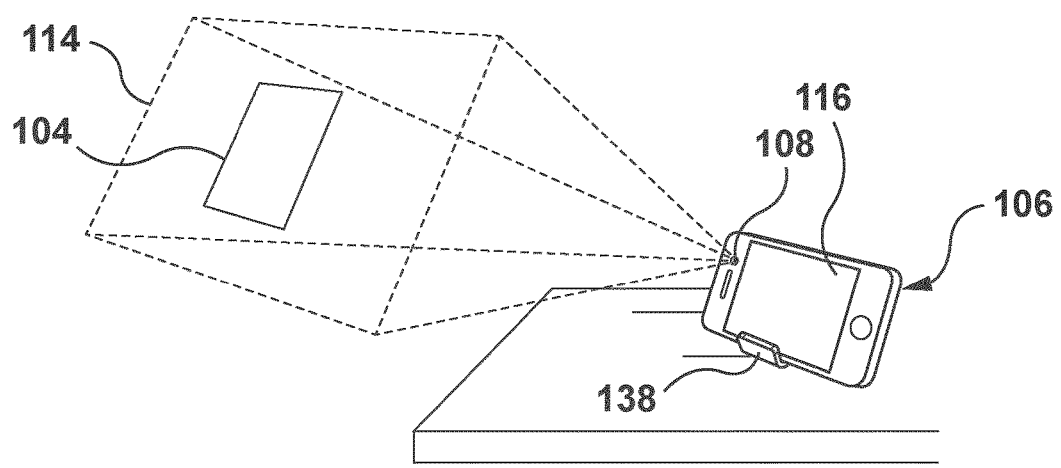
FIG. 2 is a perspective view of the gaming system of FIG. 1 in use capturing an image of one of the triggering objects of FIG. 1.

Referring to FIG. 2, the camera 108 may be any suitable camera that can capture images within a zone of interactivity 114 in the field of view of the camera 108. The term 'zone of interactivity' is used herein to refer to the space in the field of view of the camera 108 in which users may flash or place the triggering objects 104 (as will be described below), wherein the resulting images of the triggering objects 104 taken by the camera 108 may be read by the computing device 112. In the example shown, the camera is a 'front-facing' camera of the gaming device.

In the example shown, the zone of interactivity 114 is a 3-dimensional space, namely a generally pyramidal space extending outwardly from the camera 108, and directly in front of the camera 108. In examples in which the zone of interactivity 114 is a 3-dimensional space, it is not necessarily required for the triggering objects 104 to be placed on a flat surface in the field of view of the camera 108. This can allow for improved game play, as users can 'flash' objects into and out of the zone of interactivity 114 relatively quickly, without having to put down the objects. It can also allow for increased mobility of the system 100, for example the system can be used in situations where a flat surface is not available (e.g. in a car). It can also allow for different types of interactivity, for example the recognition of facial expressions and/or hand gestures (as will be described below).

Referring back to FIG. 1, in the example shown, the audiovisual output device 110 includes a screen 116 and a speaker 118, both of which are built into the gaming device 106. In alternative examples, the audiovisual output device may be of another configuration that allows for the output of audio and/or video. For example, the audiovisual output device may include a screen only or a speaker only (i.e. the term 'audiovisual' does not necessarily require the output of both audio and video). For further example, the audiovisual output device may include a projector, and/or a set of earphones or headphones.

Referring to FIG. 3, the computing device 112, audiovisual output device 110, and camera 108 are schematically shown. As used herein, the term 'computing device' can refer to a computer processor or multiple computer processors, or a device containing one or more computer processors, optionally in combination with other hardware. In the example shown, the computing device 112 includes the processor(s) and associated hardware built into the gaming device 106. The computing device 112 is connected to the camera 108 and the audiovisual output device 110. The computing device 112 is also connected to the memory 120 of the gaming device 106.

As mentioned above, the system 100 may include software in the form of an application, such as a mobile app or a desktop app. In the example shown, the system 100 includes a mobile app that is downloadable on to the gaming device 106. The app includes a set of responses that can be stored locally in the memory 120 of the gaming device 106, or stored remotely (e.g. in the cloud). As used herein, the term 'response' refers generally to data that is retrieved and/or processed (e.g. by rendering the data) by the app as a result of input by the user, and/or to the retrieval and/or processing of that data, and/or to the result when that data is retrieved or processed. That is, the term 'response' can refer to data itself, or to the retrieval and/or processing of that data, and/or to the tangible result when that data is retrieved or processed. For example, the term 'response' can refer to video data stored in the memory 120 (or elsewhere, e.g. in cloud-based storage), or to the resulting video played on the screen 116 of the gaming device 106 when that data is retrieved. In general, the term 'response' can refer to, but is not limited to, the playing of video, the playing of audio, the display of image(s), instructions that put the system in a secondary mode of operation, video data, audio data, image data, data that can be processed (e.g. rendered) to yield video and/or audio and/or images, and/or the processing of such data.

In some examples, the responses are pre-produced audiovisual responses. As used herein, the term 'audiovisual response' refers to a response in the form of one or more clips of video and/or one or more sections of audio (whether the video and/or audio itself, or the data for that video and/or audio), or in the form of data that can be processed to yield one or more clips of video and/or one or more sections of audio (e.g. image data that is rendered by the computing device to yield animation data). The term 'pre-produced' indicates that the audiovisual response (e.g. a section of audio, or a clip of video, or animation data that can be rendered to yield animated video, or image data that can be processed to yield video) is provided as part of the system, and can, for example, be downloadable with the application. For example, in one version of the app, the pre-produced audiovisual responses may be clips of an animated video. The clips may include common characters (e.g. a girl and a boy), and may be produced so that the clips can be combined in various permutations to create a story. For example, the pre-produced audiovisual responses may include a clip of the characters walking, a clip of the characters in school, a clip of the characters eating lunch, a clip of the characters laughing, and so on. The clips of video and/or sections of audio may in some examples be relatively short, e.g. less than 30 seconds or less than 10 seconds. In another example, the pre-produced audiovisual responses may be animation data that can be rendered to yield clips of an animated video.

In some examples, the responses are controlling responses (which will be described in further detail below). As used herein, the term 'controlling response' refers to a response that puts the system in a secondary mode or other alternative mode of operation.

As will be described below, in the examples shown, each response corresponds to at least one of the triggering objects 104, and each triggering object 104 corresponds to at least one of the responses. That is, each triggering object 104, when placed in the zone of interactivity 114, triggers one or more corresponding responses from the system 100.

Figure 4:
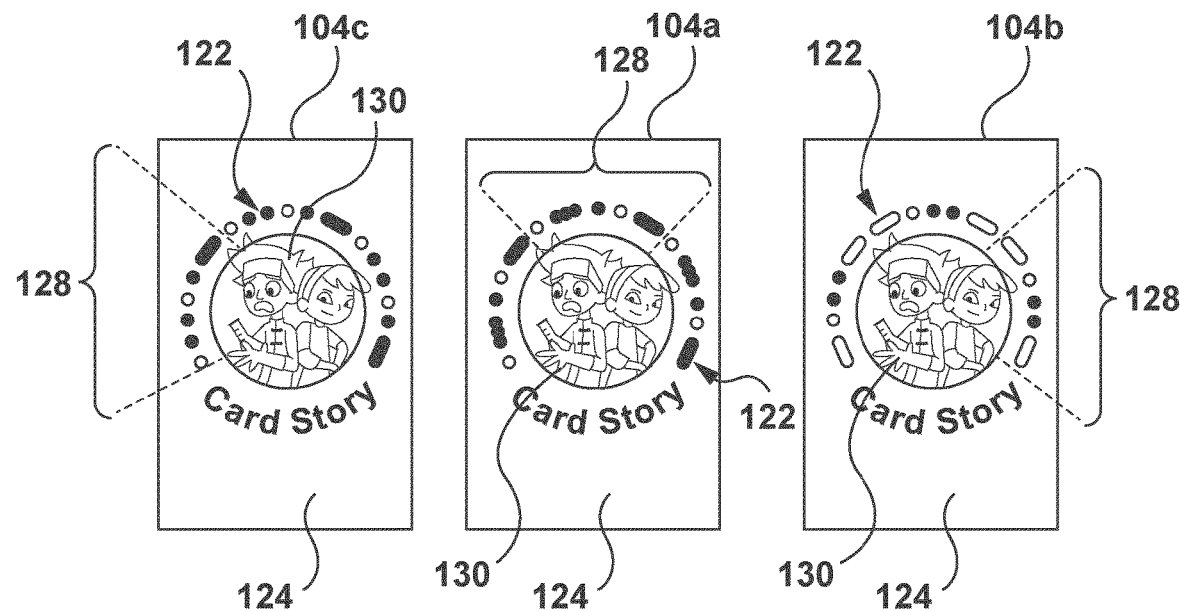
FIG. 4 is a top view of three triggering objects of the set of triggering objects of FIG. 1, showing a first face of the triggering objects.
Figure 5:
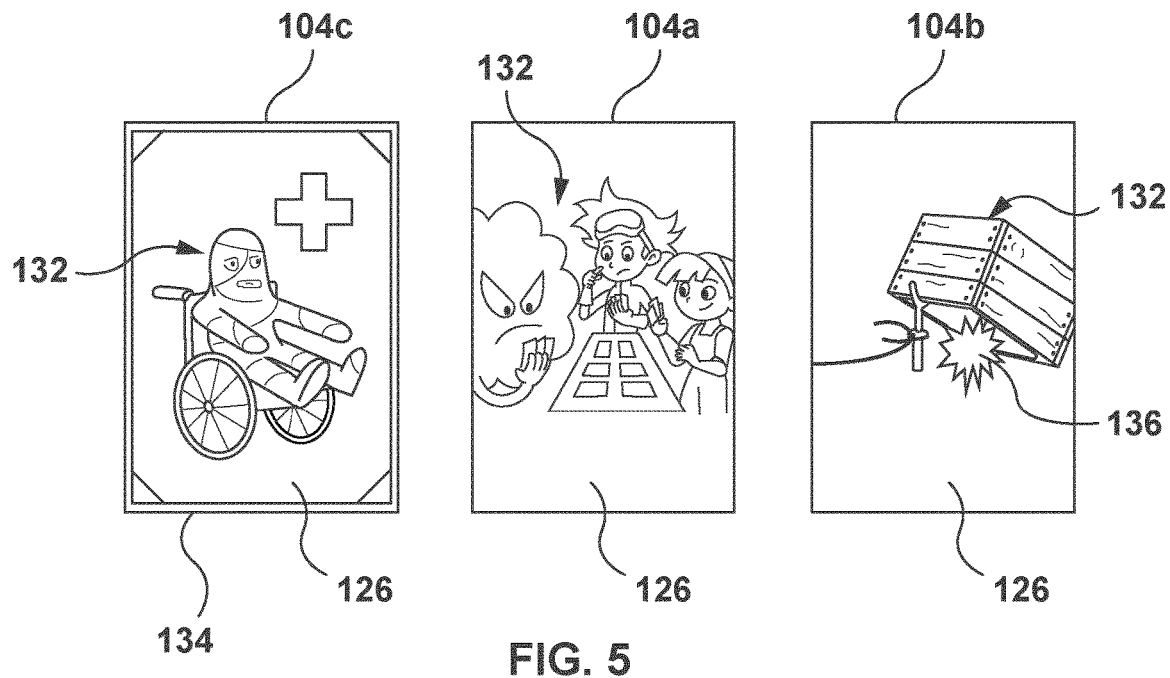
FIG. 5 is a bottom view of the three triggering objects of FIG. 4, showing a second face of the triggering objects.

Referring now to FIGS. 4 and 5, the triggering objects 104 are shown in more detail. In the example shown, the triggering objects 104 are in the form of playing cards. The cards may be, for example, made from paper or plastic. The cards may have a non-reflective finish, in order to facilitate computer reading of the images thereon. In alternative examples, triggering objects can be in another form, such as blocks, dolls, coins, figurines, chips, tokens, etc.

Referring to FIG. 4, each triggering object 104 includes a computer readable image 122. The camera 108 can capture an image of the computer readable image 112, and the resulting image can be processed and read by the computing device 112, to trigger the corresponding response(s).

Referring still to FIG. 4, in the example shown, the triggering objects 104 have a first face 124 and a second face 126 (shown in FIG. 5), and the computer readable image 122 is printed on the first face 124. Each computer readable image 122 includes a coded cue 128. The coded cues 128 may be readable by the computing device 112, but may be generally unreadable or difficult to read by the human eye. In the example shown, the coded cues 128 are specific to the system 100, and include a series of circles or ovals, which are filled or unfilled, to create several hundred unique coded cues. Because the coded cues 128 carry a limited number of possibilities (i.e. several hundred versus several million), the coded cues 128 can be recognized by computer vision relatively quickly (i.e. in milliseconds) and consistently, even in a variety of environmental conditions (e.g. at different angles, in different lighting, etc.). In alternative examples, the coded cues may be non-specific. For example, the coded cues may be bar-codes or QR codes.

Referring still to FIG. 4, in the example shown, for a given card, the coded cue 128 is repeated three times for the purpose of redundancy. As such, if a user's finger is covering one of the coded cues 128 (or if one of the coded cues is otherwise prevented from being read by the computer), the computer may attempt to read another of the coded cues. In alternative examples, each card may include another number of coded cues.

Referring still to FIG. 4, in the example shown, each computer readable image 122 further includes an orienting image 130. The orienting image 130 can guide the computing device in reading the coded cue 128. For example, the presence of the orienting image 130 in an image captured by the camera 108 can indicate to the computing device 112 that a triggering object 104 is present in the image. For further example, if the triggering object 104 is upside down when flashed in front of the camera 108, when the computing device 112 is processing the resulting image, it will assess the orientation of the orienting image 130, and recognize that the triggering object 104 is upside down. It will then adjust its reading of the coded cue 128 accordingly.

Referring now to FIG. 5, the second face 126 of each triggering object 104 includes an indicium 132 that represents the response corresponding to that triggering object 104. For example, the second face 126 of triggering object 104a includes an image of characters playing cards, and the response triggered by triggering object 104a is the playing of an animated clip of those characters playing cards. For further example, the second face 126 of triggering object 104b includes an image of a box that can trap a "mystery" object 136 (further details of the mystery object 136 will be described below). The response triggered by triggering object 104b is the playing of an animated clip of that box trapping the mystery object 136. For further example, the second face 126 of triggering object 104c includes an image of a character in a wheelchair. The response triggered by triggering object 104b is the playing of an animated clip of that character being pushed in a wheelchair.

In some examples, the indicium is computer-readable. This may be for redundancy, in the event that the coded cues 128 on the first face 124 cannot be read by the computing device 112.

In alternative examples, the coded cue may be omitted, and the indicium may be the computer readable image.

Figure 8:
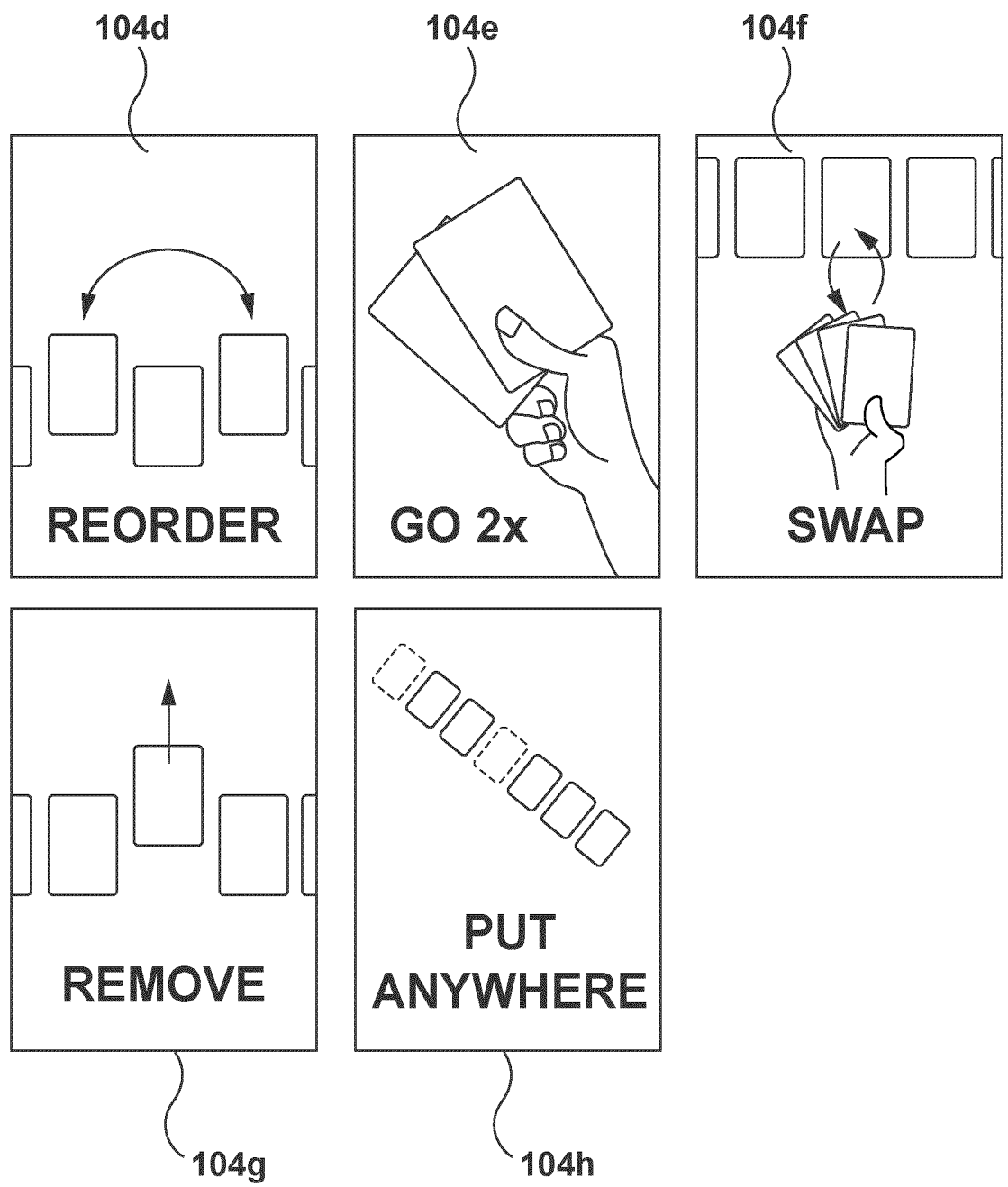
FIG. 8 is a top plan view of example triggering objects in the form of controlling objects.

As mentioned above, some of the responses may be controlling responses. The controlling responses may be triggered by specific triggering objects referred to as controlling objects. Referring still to FIG. 5, in the example shown, triggering object 104c is a controlling object. The dark border 134 around the edge of triggering object 104c indicates to the user that in addition to the pre-produced audiovisual response corresponding to triggering object 104c, there is a controlling response corresponding to triggering object 104c. In this example, the controlling response triggered by the controlling object is to trigger a final round of the game. Various alternative controlling objects (identified as 104d to 104i) are shown in FIG. 8.

In some examples, the system may allow for users to record a voice-over for the concatenated audio/video (or for individual audio-visual responses).

In some examples, the system may allow for users to save and share concatenated audio/video (e.g. to public video sharing websites or to a private storytelling community, which may be a part of the system, and which may be child-safe).

In some examples, the system may include a voice-recognition (and/or an image recognition) tool, and may automatically review and edit any voice-overs (and/or added images) prior to the sharing of the concatenated audio/video, so that personal information is removed from the voice-over (and/or the added images). This may be beneficial for child safety. For example, if a child records a voice-over, and includes their name and address, the voice-recognition tool may review the voice-over and identify the personal information, and remove that information or instruct the user to resubmit new information.

The voice-recognition tool may transcribe the voice-over into text, which is then processed using a natural language processing function to identify personal information within the text. For example, the natural language processing function may used named entity recognition (NER) or part-of-speech tagging (POS) to identify personal information within the text. For example, the presence of a commercial at (@) may indicate that an email address is present in the voice-over. Alternatively, a particular string of numbers and/or letters may indicate that a phone number, zip code, or postal code is present in the voice-over.

In some examples, the system may allow for users to grade the concatenated audio/video shared by other users, or to edit the concatenated audio/video shared by others.

In some examples, the computing device 112 may grade the concatenated audio/video. This may be facilitated by machine learning. For example, a machine learning algorithm may be based on grading done by other users.

Figure 6:
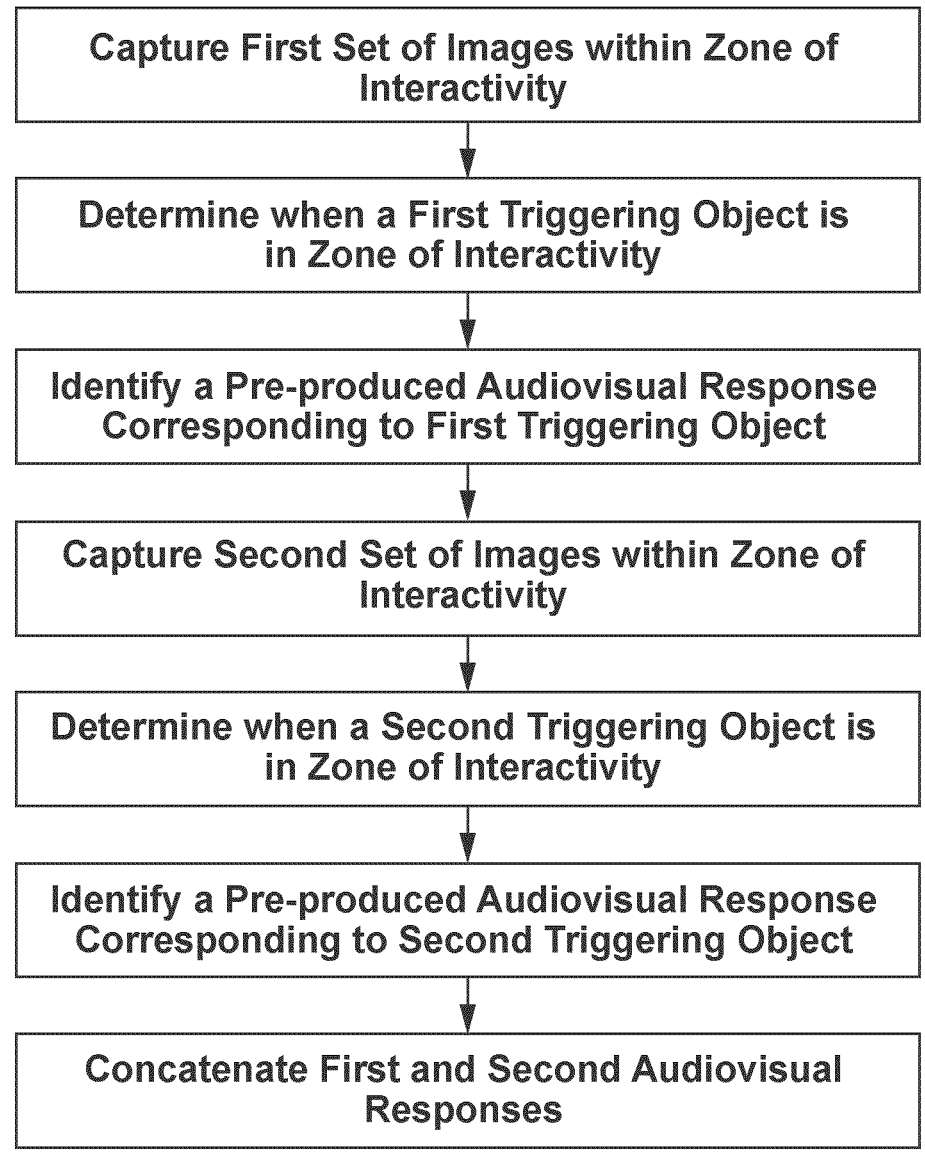
FIG. 6 is a flow diagram depicting the operation of the system of FIG. 1.

A general example of the operation of the system will now be described with reference to FIG. 6. Detailed examples will follow.

As mentioned above, the camera 108 captures images within the zone of interactivity 114. When the app is running, the camera 108 may continually capture the images, and communicate the images to the computing device 112.

The computing device 112 is configured to process and read the images, and based on the presence or absence of the computer readable images 122 in the images, determine if/when a triggering object 104 has been placed in the zone of interactivity 114.

The computing device 112 can read the images in a variety of ways. In some examples, the computing device 112 can be 'trained' to recognize the images using videotaped game play. In some examples, a convolutional neural network model may be employed to facilitate training of the computing device 112. In some examples, a pre-existing image recognition and/or artificial intelligence solution is used to read the images. For example, the computing device 112 can employ technology available under the brand names catchoom®, clarifai, and TensorFlow™. Briefly, the computing device 112 can use the image recognition solution to make predictions as to which triggering object is in the zone of interactivity 114. Multiple predictions can be made, with confidence scores for each prediction. The prediction with the highest confidence score can be used to identify the triggering object.

When the computing device 112 determines that a first triggering object 104 (also referred to herein as 'a first one of the triggering objects') has been placed in the zone of interactivity 114, it reads the computer readable image 122, and identifies, from the set of stored responses, the particular pre-produced audiovisual response (referred to herein as a 'first pre-produced audiovisual response') corresponding to the first triggering object 104. Optionally, after identifying the first pre-produced audiovisual response, the computing device 112 can trigger the audiovisual output device 110 to play the first pre-produced audiovisual response.

The camera 108 can continue to capture the images, and communicate the images to the computing device 112. When the computing device 112 determines that a second triggering object 104 (also referred to herein as 'a second one of the triggering objects') has been placed in the zone of interactivity 114, it reads the computer readable image 122 and identifies, from the set of stored responses, the particular pre-produced audiovisual response (referred to herein as a second pre-produced audiovisual response) corresponding to the second triggering object 104. Optionally, after identifying the second pre-produced audiovisual response, the computing device 112 can trigger the audiovisual output device 110 to play the second pre-produced audiovisual response.

This can continue as additional triggering objects 104 are placed within the zone of interactivity 114—i.e. the camera 108 can continue to capture images and communicate the images to the computing device 112. The computing device 112 can continue to process the images to determine if/when triggering objects 104 are placed within the zone of interactivity 114, read the computer readable images 122 to identify the response associated with each triggering object 104, and optionally play the corresponding pre-produced audiovisual response, or take another action corresponding to the triggering object 104.

After two or more triggering objects 104 having corresponding pre-produced audiovisual responses have been placed within the zone of interactivity 114, the computing device 112 is configured to concatenate the pre-produced audiovisual responses corresponding to those triggering objects, to yield concatenated audio/video (where 'audio/video' refers to audio alone or video alone or video and audio combined). For example, after the first triggering object 104 and second triggering object 104 have been placed in the zone of interactivity 114, the computing device 112 concatenates the first pre-produced audiovisual response and the second pre-produced audiovisual response, into concatenated audio/video. The concatenated audio/video may include the first audiovisual response and the second audiovisual response in a generally smooth and seamless sequence. For example, if the first pre-produced audiovisual response is a first video clip (e.g. an animated clip), and the second pre-produced audiovisual response is a second video clip (e.g. an animated clip), the concatenated audio/video may include the two clips played in sequence, in a single video file or stream, so that they appear as part of a pre-produced show. The pre-produced audiovisual responses can be concatenated to play in the same sequence in which the corresponding triggering objects 104 were placed in the zone of interactivity 114.

Concatenation of the pre-produced audiovisual responses can occur at various junctures, for example after a certain number of triggering objects 104 have been placed in the zone of interactivity 114, or after a particular triggering object has been placed in the zone of interactivity 114 (e.g. control object 104c shown in FIG. 5), or upon input by a user (e.g. tapping a certain icon or pressing a button).

As used herein, the term 'concatenation' generally refers to generating a presentation (referred to as 'concatenated audio/video') by ordering the first pre-produced audiovisual response and the second pre-produced audiovisual response in a sequence. In some examples, concatenation can involve creating a single file containing the pre-produced audiovisual responses corresponding to the triggering objects placed in the zone of interactivity 114. In some examples, concatenation can involve playing, in an uninterrupted sequence, the pre-produced audiovisual responses corresponding to the triggering objects placed in the zone of interactivity 114. In some examples, concatenation can involve creating or running instructions to play the pre-produced audiovisual responses corresponding to the triggering objects placed in the zone of interactivity 114. In some examples, the system includes a data structure, and after each triggering object 114 is placed in the zone of interactivity, the data structure is populated with an identifier corresponding to that triggering object or to the pre-produced audiovisual response corresponding that triggering object, and with an order in which that triggering object is placed in the zone of activity. Concatenation can involve retrieving the data from the data structure.

In some examples, the system can include a set of stored smoothing elements.

In some examples, the term "smoothing element" refers to a short clip of audio and/or section of video and/or rendered animation that can tie together or improve the tying together of various pre-produced audiovisual responses. In some examples, as part of concatenating the pre-produced audiovisual responses, one or more of the smoothing elements can be inserted between pre-produced audiovisual responses. The beginning of each smoothing element may be configured to tie into the ending of several pre-produced audiovisual responses. The ending of each smoothing element may be configured to tie into the beginning of several pre-produced audiovisual responses. The app can store data identifying which smoothing elements tie into which pre-produced audiovisual responses, and can be configured to insert an appropriate smoothing element between pre-produced audiovisual responses during concatenation.

For example, one smoothing element, referred to as "smoothing element A" may be a short video clip of characters walking through a door into a house. The beginning of this smoothing element can be used to tie into all pre-produced audiovisual responses in which the characters are outside. The ending of this smoothing element can be used to tie into all pre-produced audiovisual responses in which the characters are inside. Another smoothing element, referred to as "smoothing element B", may be a short video clip of characters walking through a door out of a house. The beginning of this smoothing element can be used to tie into all pre-produced audiovisual responses in which the characters are inside. The ending of this smoothing element can be used to tie into all pre-produced audiovisual responses in which the characters are outside. Accordingly, if a first and a second triggering object are played in sequence, where the first pre-produced audiovisual response is a video clip of characters walking on a sidewalk, and the second pre-produced audiovisual response is a video clip of characters in a kitchen, when the computing device concatenates the first and second pre-produced audiovisual responses, it may insert smoothing element A between the first and second pre-produced audiovisual responses. Alternatively, if the second triggering object is played before the first triggering object, when the computing device concatenates the second and first pre-produced audiovisual responses, it may insert smoothing element B between the first and second pre-produced audiovisual responses.

In another example, as part of concatenating the pre-produced audiovisual responses, one or more of the smoothing elements can be combined with the pre-produced audiovisual responses. For example, the pre-produced audiovisual responses can include video only (without audio), and the smoothing elements can include audio. As part of concatenation, an audio smoothing element can be combined with each video response. The audio smoothing element can be selected by the system based on the particular triggering objects that have already been played in the sequence. This can allow for the audio associated with a video response to vary in order to better suit the particular story being created. In some examples, the term "smoothing element" refers to data that is used to edit the pre-produced audiovisual responses, to tie together or improve the tying together of various pre-produced audiovisual responses. For example, if a first pre-produced audiovisual response in a sequence is a video of a character eating a hot dog, and the second audiovisual response in the sequence is a video of a character throwing an object, the smoothing elements can be used to edit the second audiovisual response so that the thrown object is a hot dog. Alternatively, if a first pre-produced audiovisual response in a sequence is a video of a character eating a banana, and the second audiovisual response in the sequence is a video of a character throwing an object, the smoothing elements can be used to edit the second audiovisual response so that the thrown object is a banana. In such examples, the unedited pre-produced audiovisual response can be referred to as a 'parent' response, and the edited audiovisual response can be referred to as a 'child' response.

In some examples, smoothing elements are used automatically upon concatenation. In other examples, smoothing elements are used automatically upon the identification of a pre-produced audiovisual response. In other examples, smoothing elements are used upon input by a user.

In some examples, as part of concatenation, the computing device 112 can trigger the audiovisual output device 110 to play the concatenated audio/video. This can occur automatically, or upon input from a user (e.g. by tapping a 'play' icon).

As mentioned above, some of the responses may be "controlling responses", and some of the triggering objects 104 may be "controlling objects". The controlling objects may be used to put the system 100 in a secondary mode of operation. For example, after several triggering objects 104 have been placed in the zone of interactivity 114 and their corresponding pre-produced audiovisual responses identified, a controlling object may be placed in the zone of interactivity 114. The computing device 112 is configured to determine, based on the computer readable image 122 on the controlling object, when the controlling object is within the zone of interactivity 114, and identify the controlling response corresponding to the controlling object. The computing device 112 may then put the system 100 in a secondary mode of operation. In some examples, in the secondary mode of operation, the concatenated audio/video and/or the pre-produced audiovisual responses may be user editable. For example, in the secondary mode of operation, a user may place the pre-produced audiovisual responses in a different order, remove one or more of the pre-produced audiovisual responses, and/or to insert additional pre-produced additional audiovisual responses at a specific point (e.g. in the middle of the sequence of clips), and/or to use a smoothing element. Alternatively, in the secondary mode of operation, other action may be taken, such as ending of the game.

As mentioned above, some triggering objects may include mystery objects 136 (e.g. triggering object 104*b*). The computing device 112 can be configured to assign a specific object to the mystery object 136, optionally based on the nature of the triggering objects 104 previously placed in the zone of interactivity 114. For example, triggering object 104*b* may have several corresponding pre-produced audiovisual responses. In one of the corresponding pre-produced audiovisual responses, the mystery object 136 may be a wheelchair, in another, the mystery object 136 may be a monster, in another, the mystery object 136 may be a hot dog, and so on. In use, triggering object 104*a*—which has a corresponding audiovisual response including a monster— may be the first triggering object placed in the zone of interactivity 114, and triggering object 104*b* may be the second triggering object placed in the zone of interactivity 114. Since the pre-produced audiovisual response corresponding to triggering object 104*a* includes a monster, the computing device may identify, as the pre-produced audiovisual response corresponding to triggering object 104*b*, the pre-produced audiovisual response in which the mystery object 136 is a monster.

In some examples, the system may include a set of stored substitute responses, and the computing device 112 may be configured to determine when multiple triggering objects 104 are concurrently within the zone of interactivity 114, and to trigger one of the substitute responses based on the presence of the multiple triggering objects and the computer readable images on the multiple triggering objects. For example, if triggering object 104*a* and 104*b* are concurrently within the zone of activity, the computing device may display instructions directing the users to play only one card at a time. Alternatively, if triggering object 104*a* and 104*c* are concurrently within the zone of activity, and since triggering object 104*c* is a controlling object that ends the game, the computing device may play the pre-produced audiovisual response corresponding to triggering object 104*a*, play the pre-produced audiovisual response corresponding to triggering object 104*c*, and then end the game.

In some examples, the computing device can be configured to identify hand gestures and facial expressions in the images taken by the camera, and to take action based on the hand gestures and facial expressions. For example, a given triggering object may have two corresponding pre-produced audiovisual responses. The first may be a video clip of a character angrily speaking, and the second may be a video clip of a character happily speaking. If the given triggering object is placed within the zone of interactivity, and at the same time the player makes an angry facial expression within the zone of interactivity, computing device may identify the first pre-produced audiovisual response. Alternatively, if the given triggering object is placed within the zone of interactivity, and at the same time the player smiles within the zone of interactivity, computing device may identify the second pre-produced audiovisual response.

The computing device 112 can read the hand gestures and/or facial expressions in a variety of ways. In some examples, the computing device 112 can be 'trained' to recognize the hand gestures and/or facial expressions using videotaped game play. In some examples, pre-existing libraries of hand gestures and/or facial expressions may be used to train the computing device.

Figure 7:
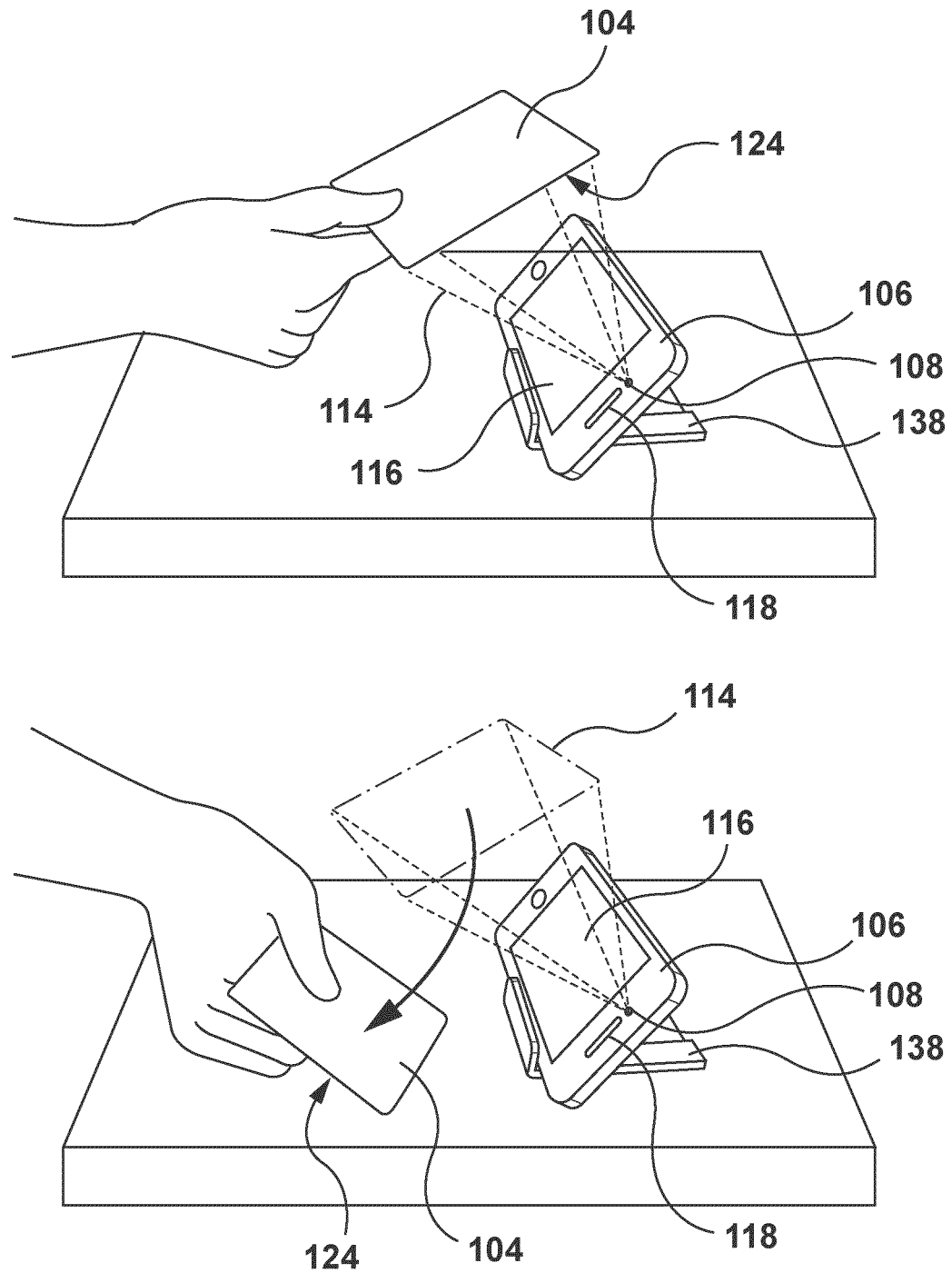
FIG. 7 is a perspective view showing one of the triggering objects of FIG. 1 being flashed in front of the gaming device of FIG. 1.
Figure 9:
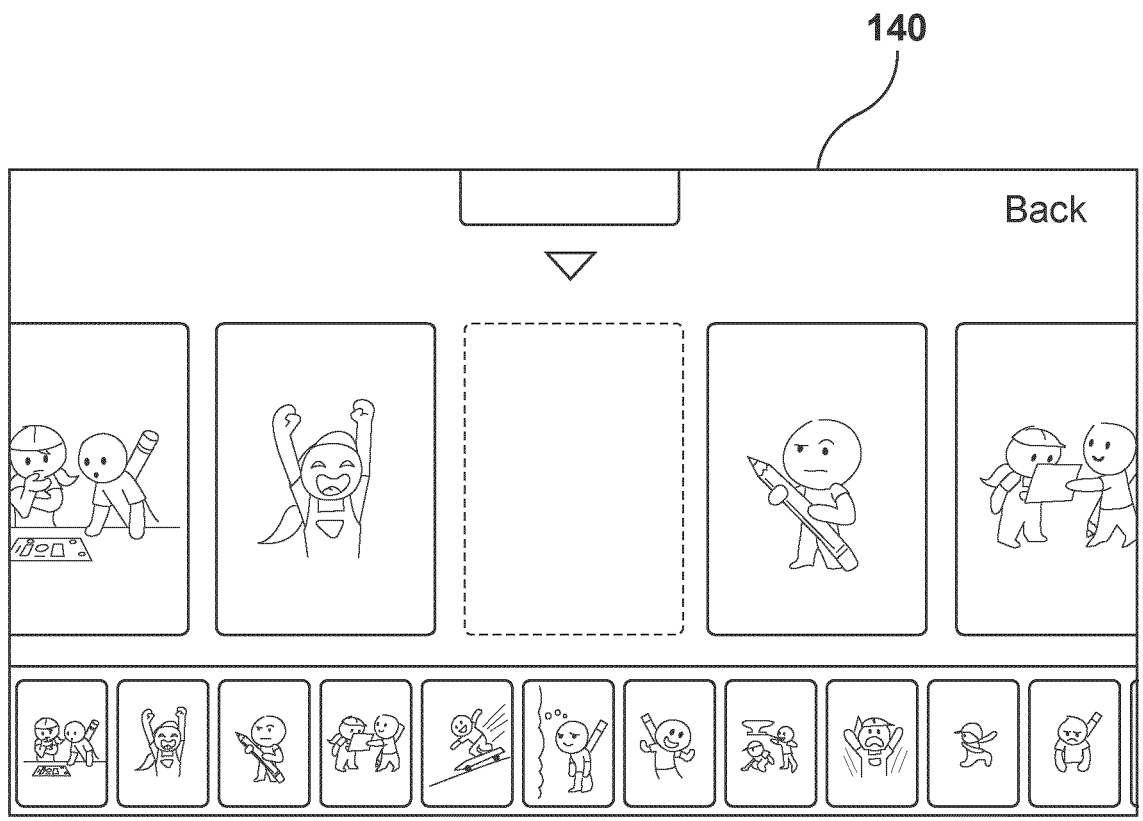
FIG. 9 is a schematic view of an interactive screen usable to edit concatenated audio/video.

A more detailed example of the use of system 100 as a children's game will now be described. From the set 102 of triggering objects 104, eight triggering objects 104 may be dealt to each of 4 players. Of the eight triggering objects 104 in each hand, most or all may be standard triggering objects (i.e. triggering objects corresponding to a pre-produced audiovisual response), and one or more may be controlling objects. The gaming device 106 may be set up on a stand 138 (which optionally may be sold as part of the system), and the app may be opened. To start the game, as shown in FIG. 7, a first player may flash the first face 124 of one of their standard triggering objects 104 in front of the camera 108, in the zone of interactivity 114. The gaming device 106 may then play the audiovisual response—e.g. an animated clip— corresponding to that triggering object 104 on the screen 116 and with the speaker 118. A second player may then flash the first face 124 of one of their standard triggering objects 104 in front of the camera 108, in the zone of interactivity 114. The gaming device 106 may then play the audiovisual response—e.g. an animated clip—corresponding to that triggering object 104. A third player may then flash the first face 124 of one of their standard triggering objects 104 in front of the camera 108, in the zone of interactivity 114. The gaming device 106 may then play the audiovisual response corresponding to that triggering object 104. A fourth player may then flash the first face 124 of one of their standard triggering objects 104 in front of the camera 108, in the zone of interactivity 114. The gaming device 106 may then play the audiovisual response corresponding to that triggering object 104. This cycle of each player flashing a triggering object 104 in front of the camera 108, with the corresponding audiovisual response then being played by the gaming device 106, is then repeated. At any turn, a player may flash a controlling object in front of the camera 108, in the zone of interactivity 114. This puts the game in a secondary mode of operation. In the secondary mode of operation, an interactive screen is presented to the user. Depending on the nature of the controlling object, the player can use the interactive screen to re-order the pre-produced audiovisual responses corresponding to the triggering objects 104 that have already been played, to remove one of the pre-produced audiovisual responses corresponding to triggering objects 104 that have already been played, to insert a new pre-produced audiovisual response into a desired location in the existing sequence of pre-produced audiovisual responses, and so on. An example of an interactive screen 140 that is usable to insert a pre-produced audiovisual response into a desired location is shown in FIG. 9. Upon completion of the game (e.g. when all of the triggering objects 104 have been played, or when a certain control object has been played, or after a certain amount of time, or upon other input by a player), the system creates and plays a video corresponding to all of the triggering objects 104 that have been played during the game. That is, the computing device 112 concatenates the pre-produced audiovisual responses corresponding to the triggering objects 104 that have been played, factoring in the modifications made by the use of the controlling cards, and optionally inserting smoothing elements, to yield concatenated audio/video. The concatenated audio/video is generally smooth and seamless stream of audio/video. For example, if the pre-produced audiovisual responses are animated clips, the concatenated audio/video appears as a pre-produced show containing the clips. The concatenated audio/video may optionally be saved for later viewing.

Figure 10:
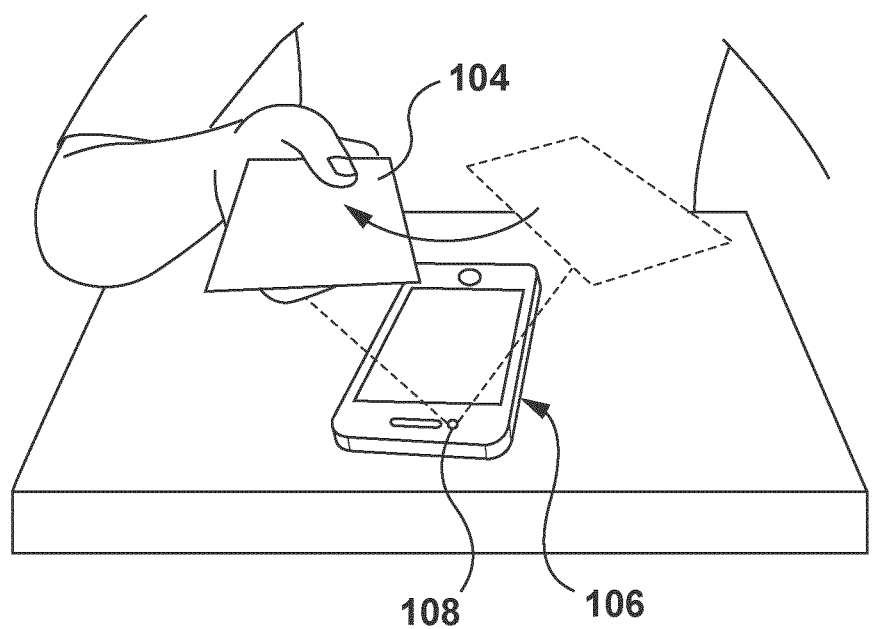
FIG. 10 is a perspective view similar to that of FIG. 7, with the gaming device in an alternative position.

In an alternative example, shown in FIG. 10, the stand 138 may be omitted, and the gaming device 106 may simply be placed 'face-up' on a surface, with the camera 108 facing upward. Triggering objects 104 may then be flashed or held above the gaming device 106.

While the above description provides examples of one or more processes or apparatuses, it will be appreciated that other processes or apparatuses may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A system for playing audio/video, the system comprising:
   a. a set of triggering objects, each triggering object of the set having a respective computer readable image;
   b. a camera for capturing images within a zone of interactivity in a field of view of the camera;
   c. an audiovisual output device;
   d. a set of stored responses, wherein each response of the set of stored responses corresponds to at least one of the triggering objects; and
   e. a computing device connected to the camera and to the audiovisual output device, the computing device configured to i) process the images and determine, based on the computer readable images, when a first one of the triggering objects is within the zone of interactivity; ii) identify, from the set of stored responses, a response corresponding to the first one of the triggering objects, wherein the response corresponding to the first one of the triggering objects is a first pre-produced audiovisual response; iii) process the images and determine, based on the computer readable images, when a second one of the triggering objects is within the zone of interactivity; iv) identify, from the set of stored responses, a response corresponding to the second one of the triggering objects, wherein the response corresponding to the second one of the triggering objects is a second pre-produced audiovisual response; v) after the first one of the triggering objects and the second one of the triggering objects have been placed within the zone of interactivity, recognize a sequence in which the first one of the triggering objects and the second one of the triggering objects were placed within the zone of interactivity; and vi) concatenate the first pre-produced audiovisual response and the second pre-produced audiovisual response in a concatenation sequence that corresponds to the sequence in which the first one of the triggering objects and the second one of the triggering objects were placed within the zone of interactivity, to yield concatenated audio/video;
   wherein the first one of the triggering objects and the second one of the triggering objects are standard triggering objects and the first pre-produced audiovisual response and the second pre-produced audiovisual response are standard responses; and
   wherein the set of triggering objects further comprises at least one controlling object, and the computing device is further configured to vii) determine, based on the computer readable images, when the controlling object is within the zone of interactivity; viii) identify, from the set of stored responses, a controlling response corresponding to the controlling object; and ix) in response to the controlling object being within the zone of interactivity, put the system in a secondary mode of operation in which a user is presented with an interactive screen usable to control the concatenated audio/video in accordance with the controlling response.

2. The system of claim 1, wherein concatenation of the first pre-produced audiovisual response and the second pre-produced audiovisual response comprises triggering the audiovisual output device to play the first pre-produced audiovisual response and the second pre-produced audiovisual response in the concatenation sequence.

3. The system of claim 1, wherein the first pre-produced audiovisual response comprises a first video clip, the second audiovisual response comprises a second video clip, and the concatenated audio/video comprises the first video clip and the second video clip in the concatenation sequence.

4. The system of claim 1, wherein the stored responses comprise video responses and/or audio responses.

5. The system of claim 1, wherein each computer readable image comprises a respective a coded cue, and each respective coded cue is repeated on the triggering object for redundancy.

6. The system of claim 5, wherein each computer readable image further comprises an orienting image for guiding the computing device in reading the coded cue.

7. The system of claim 6, wherein each triggering object of the set includes a playing card having first face and a second face, wherein the coded cue is on the first face, wherein the second face comprises an indicium, and wherein the indicium is representative of the response corresponding to the respective triggering object.

8. The system of claim 1, wherein the zone of interactivity is three-dimensional.

9. The system of claim 1, wherein in the secondary mode of operation, the concatenated audio/video is user editable via the interactive screen to place the first pre-produced audiovisual response and the second pre-produced audiovisual response in a different order, and/or to remove at least one of the first pre-produced audiovisual response and the second pre-produced audiovisual response from the concatenated audio/video, and/or to insert an additional audiovisual response into the concatenated audio/video at a specific point.

10. The system of claim 1, wherein the computing device is configured to determine when multiple triggering objects are concurrently within the zone of interactivity, and to trigger one of a set of substitute responses based on the presence of the multiple triggering objects and the computer readable image on the multiple triggering objects.

11. The system of claim 1, wherein the computing device is further configured to determine, based on the computer readable images, when additional triggering objects are within the zone of interactivity; identify, from the set of stored responses, additional pre-produced audiovisual responses corresponding to the additional triggering objects; recognize a sequence in which the additional triggering objects were placed within the zone of interactivity; and when the additional triggering objects have been placed within the zone of interactivity, concatenate the additional pre-produced audiovisual responses with the first pre-produced audiovisual response and the second pre-produced audiovisual response in the sequence in which the additional triggering objects were placed within the zone of interactivity.

12. The system of claim 1, wherein each triggering object of the set includes a playing card having first face and a second face, and the second face comprises an indicium that is representative of the response corresponding to the respective triggering object, and wherein the indicium comprises the computer readable image.

13. The system of claim 1, wherein in the secondary mode of operation, the concatenated audio/video is user editable via the interactive screen to insert an additional audiovisual response into the concatenated audio/video.

14. A method for playing audio/video, comprising:
  a. capturing a first set of images within a zone of interactivity in a field of view of a camera;
  b. processing the first set of images with a computing device to determine when a first triggering object has been placed within the zone of interactivity;
  c. with the computing device, from a set of stored responses, identifying a first pre-produced audiovisual response corresponding to the first triggering object;
  d. capturing a second set of images within the zone of interactivity in the field of view of the camera;
  e. processing the second set of images with the computing device to determine when a second triggering object has been placed within the zone of interactivity;
  f. with the computing device, from the set of stored responses, identifying a second pre-produced audiovisual response corresponding to the second triggering object;
  g. concatenating the first pre-produced audiovisual response and the second pre-produced audiovisual response to yield concatenated audio/video, by recognizing a sequence in which the first triggering object and the second triggering object are placed within the zone of interactivity, and concatenating the first pre-produced audiovisual response and the second audiovisual response in the sequence;
  h. capturing a third set of images within the zone of interactivity in the field of view of the camera;
  i. processing the third set of images with the computing device to determine when a controlling object has been placed within the zone of interactivity;
  j. with the computing device, from the set of stored responses, identifying a controlling response corresponding to the controlling object; and
  k. with the computing device, entering a secondary mode of operation in which a user is presented with an interactive screen usable to control the concatenated audio/video in accordance with the controlling response.

15. The method of claim 14, wherein step g. comprises triggering the playing of the first pre-produced audiovisual response and the second pre-produced audiovisual response in the sequence.

16. The method of claim 14, wherein step b. comprises, with the computing device, reading a coded cue on the first triggering object.

17. The method of claim 16, wherein the concatenated audio/video is editable to place the first pre-produced audiovisual response and the second pre-produced audiovisual response in a different order, remove at least one of the first pre-produced audiovisual response and the second pre-produced audiovisual response from the concatenated audio/video, and/or insert an additional pre-produced audiovisual response into the concatenated audio/video.

18. The method of claim 14, further comprising, with the computing device, determining when multiple triggering objects are concurrently placed within the zone of interactivity, and triggering a substitute response based on the presence of the multiple triggering objects.

19. A system for playing audio/video, the system comprising:
  a. a set of triggering objects, each triggering object of the set having a respective computer readable image;
  b. a camera for capturing images within a three-dimensional zone of interactivity in a field of view of the camera;
  c. an audiovisual output device;
  d. a set of stored responses, wherein each response of the set of stored responses corresponds to at least one of the triggering objects; and
  e. a computing device connected to the camera and to the audiovisual output device, the computing device configured to i) process the images and determine, based on the computer readable images, when a first one of the triggering objects is within the zone of interactivity; ii) identify, from the set of stored responses, a response corresponding to the first one of the triggering objects, wherein the response corresponding to the first one of the triggering objects is a first pre-produced audiovisual response; iii) process the images and determine, based on the computer readable images, when a second one of the triggering objects is within the zone of interactivity; iv) identify, from the set of stored responses, a response corresponding to the second one of the triggering objects, wherein the response corresponding to the second one of the triggering objects is a second pre-produced audiovisual response; v) after the first one of the triggering objects and the second one of the triggering objects have been placed within the zone of interactivity, recognize a sequence in which the first one of the triggering objects and the second one of the triggering objects were placed within the zone of interactivity; and vi) concatenate the first pre-produced audiovisual response and the second pre-produced audiovisual response in a concatenation sequence that corresponds to the sequence in which the first one of the triggering objects and the second one of the triggering objects were placed within the zone of interactivity, to yield concatenated audio/video;
    wherein the first one of the triggering objects and the second one of the triggering objects are standard triggering objects and the first pre-produced audiovisual response and the second pre-produced audiovisual response are standard responses; and
    wherein the set of triggering objects further comprises at least one controlling object, and the computing device is further configured to vii) determine, based on the computer readable images, when the controlling object is within the zone of interactivity; viii) identify, from the set of stored responses, a controlling response corresponding to the controlling object; and ix) in response to the controlling object being within the zone of interactivity, put the system in a secondary mode of operation in which a user is presented with an interactive screen usable to control the concatenated audio/video in accordance with the controlling response.

* * * * *